US012748993B2

(12) United States Patent
Wright et al.

(10) Patent No.: US 12,748,993 B2
(45) Date of Patent: Sep. 29, 2026

(54) OPTIMIZING QUANTUM RESOURCES FOR CALIBRATION OF A FULLY CONNECTED QPU

(71) Applicant: IonQ, Inc., College Park, MD (US)

(72) Inventors: Kenneth Wright, Berwyn Heights, MD (US); Neal Pisenti, Laurel, MD (US)

(73) Assignee: IonQ, Inc., College Park, MD (US)

( * ) Notice: Subject to any disclaimer, the term of this patent is extended or adjusted under 35 U.S.C. 154(b) by 658 days.

(21) Appl. No.: 18/331,766

(22) Filed: Jun. 8, 2023

(65) Prior Publication Data

US 2025/0356227 A1 Nov. 20, 2025

Related U.S. Application Data

(60) Provisional application No. 63/350,657, filed on Jun. 9, 2022.

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC ............................... G06N 10/20; G06N 10/40
See application file for complete search history.

(56) References Cited

U.S. PATENT DOCUMENTS

| | | | | |
|---|---|---|---|---|
| 12,475,397 | B1 * | 11/2025 | Poletto | G06N 10/40 |
| 2003/0188740 | A1 * | 10/2003 | Tribelsky | A61P 31/16 128/200.14 |
| 2004/0120844 | A1 * | 6/2004 | Tribelsky | A61L 2/088 422/38 |
| 2006/0238626 | A1 * | 10/2006 | Steiner | H04N 5/222 348/E5.022 |
| 2008/0121944 | A1 * | 5/2008 | Tang | H10P 74/23 257/E21.531 |
| 2008/0297169 | A1 * | 12/2008 | Greenquist | G01N 33/86 422/68.1 |
| 2012/0177201 | A1 * | 7/2012 | Ayling | H04L 9/0858 380/278 |
| 2015/0061715 | A1 * | 3/2015 | Faifer | G01R 1/071 324/754.23 |
| 2015/0077741 | A1 * | 3/2015 | Faifer | G01R 31/2635 356/213 |
| 2018/0011364 | A1 * | 1/2018 | Deng | H05B 33/28 |
| 2020/0320159 | A1 * | 10/2020 | Matthews | C09K 5/10 |
| 2022/0084085 | A1 * | 3/2022 | Rigetti | H04M 15/8214 |
| 2022/0165198 | A1 * | 5/2022 | Bogdanowicz | G02B 30/22 |
| 2022/0404354 | A1 * | 12/2022 | Robinson | G01N 33/558 |
| 2024/0311671 | A1 * | 9/2024 | Sete | G06N 10/20 |
| 2024/0419404 | A1 * | 12/2024 | Burchard | H04B 10/70 |
| 2025/0050809 | A1 * | 2/2025 | Huizen | B60R 1/04 |
| 2025/0190840 | A1 * | 6/2025 | Madsen | G06N 10/80 |
| 2025/0299158 | A1 * | 9/2025 | Sun | G06N 10/80 |
| 2025/0356227 | A1 * | 11/2025 | Wright | G06N 10/40 |

(Continued)

*Primary Examiner* — Eliyah S. Harper

(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to techniques for optimizing the quantum resources that are used for the calibration of a fully connected quantum processing unit or QPU.

20 Claims, 9 Drawing Sheets

(56) References Cited

U.S. PATENT DOCUMENTS

| | | | | |
|---|---|---|---|---|
| 2026/0056514 | A1* | 2/2026 | Mitchell | G05B 9/03 |
| 2026/0119931 | A1* | 4/2026 | Singh | G06N 10/20 |
| 2026/0135623 | A1* | 5/2026 | Sandor | H04B 10/70 |

* cited by examiner

OPTIMIZING QUANTUM RESOURCES FOR CALIBRATION OF A FULLY CONNECTED QPU

CROSS REFERENCE TO RELATED APPLICATIONS

The present application claims priority to and the benefit of U.S. Provisional Patent Application No. 63/350,657, entitled "Optimizing Quantum Resources for Calibration of a Fully Connected QPU," and filed on Jun. 9, 2022, the contents of which are incorporated herein by reference in their entirety.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of techniques for optimizing the quantum resources that are used for the calibration of a fully connected quantum processing unit or QPU.

In an aspect of this disclosure, a method for optimizing calibration of a QPU for gate-based operations is described that includes identifying, for a QPU configured for full connectivity between qubits, pairs of qubits to be calibrated together by using a single call to a calibration script, wherein calibration of each pair of qubits is associated with calibration of a different gate, and calibrating the pairs of qubits in the QPU by making independent, single calls for the calibration script for each of those pairs of qubits identified to be calibrated together.

In another aspect of this disclosure, a QIP system is described that includes a QPU) configured for full connectivity between qubits, a general controller, and an optical and trap controller, wherein the general controller is configured to identify, for the QPU, pairs of qubits to be calibrated together by using a single call to a calibration script, wherein calibration of each pair of qubits is associated with calibration of a different gate, and wherein the general controller and the optical and trap controller are configured to calibrate the pairs of qubits in the QPU by making independent, single calls for the calibration script for each of those pairs of qubits identified to be calibrated together.

In yet another aspect of this disclosure, a non-transitory computer readable medium containing program instructions for causing a computer to optimize calibration of a QPU for gate-based operations is described that includes code for identifying, for a QPU configured for full connectivity between qubits, pairs of qubits to be calibrated together by using a single call to a calibration script, wherein calibration of each pair of qubits is associated with calibration of a different gate, and code for calibrating the pairs of qubits in the QPU by making independent, single calls for the calibration script for each of those pairs of qubits identified to be calibrated together.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

Quantum information processing (QIP) systems require calibration of certain parameters so that gate-based operations on a given pair of qubits are successful. Such calibration is determined by interrogating the qubits themselves. The processing engine of a QIP system is generally referred to as a quantum processing unit (QPU), although the terms QIP and QPU may sometimes be used interchangeably. A QPU typically includes the portion of the QIP that has the qubits that will perform the quantum algorithms, applications, or operations. In atomic-based QIP system that use trapped ions, a QPU may refer to the portion of the system holding the ions used for qubits. A QPU can have any number of qubits. For an n-qubit QPU where any one qubit can connect to any other qubit (i.e., a fully connected QPU), the number of parameter calibrations that ensures successful gate operations is $n \cdot (n-1)/2$. If this operation is performed independently across all pairs of qubits in the QPU, a substantial overhead will be incurred not only because of the classical computation time that is required but also because of the time needed to prepare the qubits for interrogation. This overhead scales quadratically with the number of qubits in the QPU. This quadratic growth becomes a large impediment when scaling to the larger QPU architectures that are needed to perform complex quantum computations.

Solutions to the issues described above are explained in more detail in connection with FIGS. 1-8, with FIGS. 1-3 providing a background of QIP systems or quantum computers, and more specifically, of atomic-based QIP systems or quantum computers.

Figure 1:
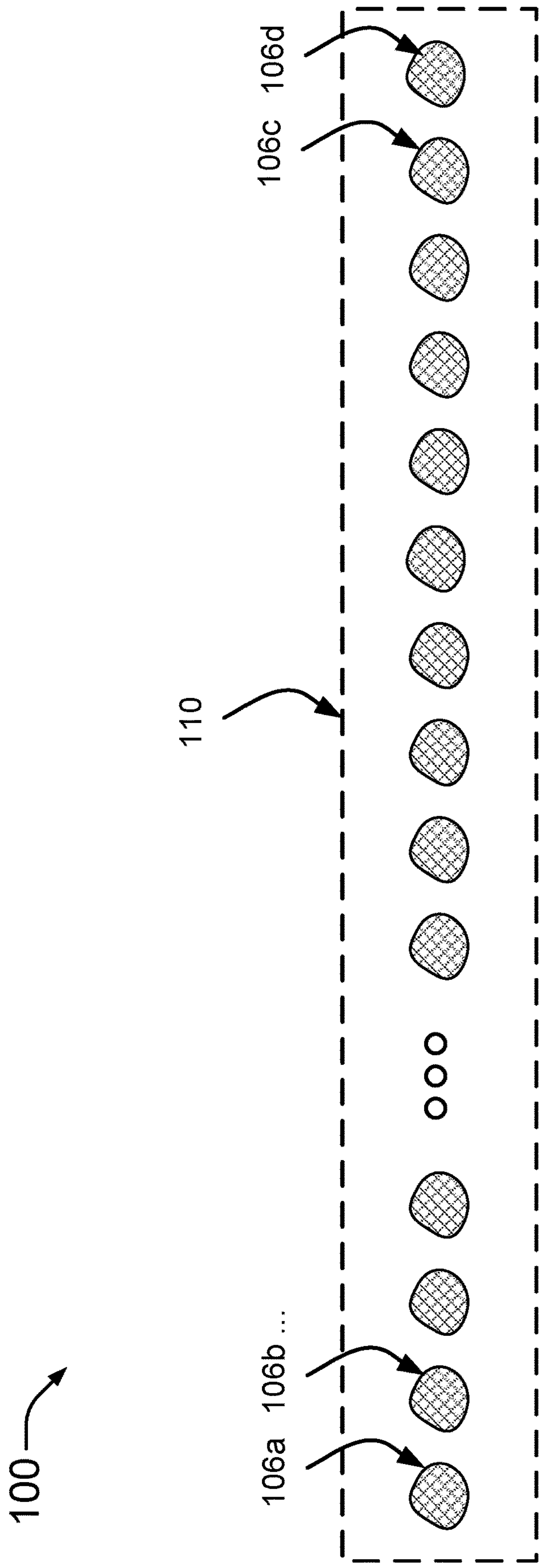
FIG. 1 illustrates a view of atomic ions a linear crystal or chain in accordance with aspects of this disclosure.
Figure 2:
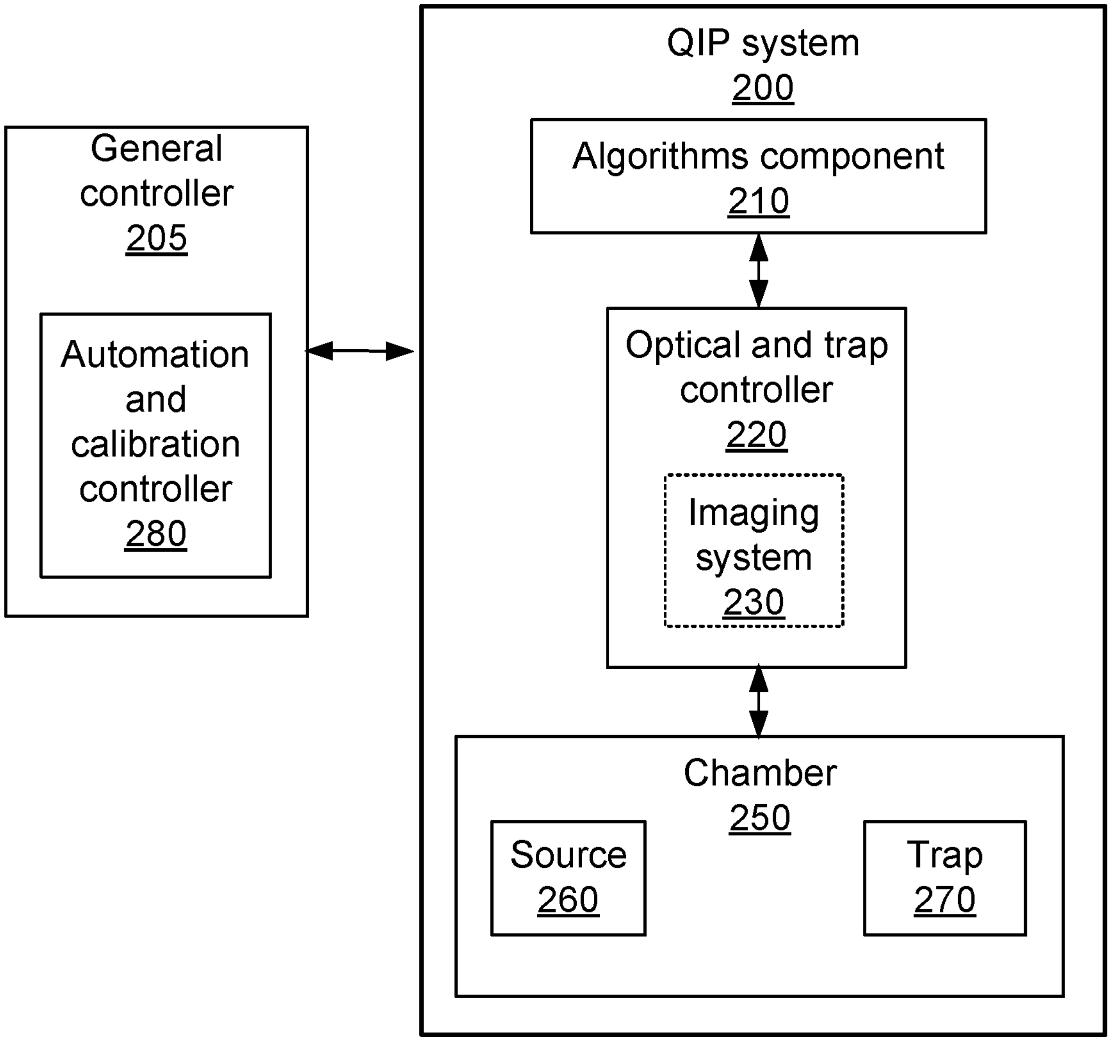
FIG. 2 illustrates an example of a quantum information processing (QIP) system in accordance with aspects of this disclosure.

FIG. 1 illustrates a diagram 100 with multiple atomic ions or ions 106 (e.g., ions 106*a*, 106*b*, . . . , 106*c*, and 106*d*) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}Yb^{+}$ ions), for example. The ions are illuminated with laser (optical) radiation tuned to a resonance in $^{171}Yb^{+}$ and the fluorescence of the ions is imaged onto a camera or some other type of detection device (e.g., photomultiplier tube or PMT). In this example, ions may be separated by a few microns (m) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

The chain 110 of ions 106 may be part of a QPU, that is, the chain 110 of ions 106 may be part of a processing engine or processing core of a QIP system. When any one of the ions 106 is capable of being connected to any other ion 106 in the chain 110, the chain 110 is considered to be fully connected, and thus, it can be used to implement a fully connected QPU. Fully connected QPUs need not be limited to atomic-based QIP systems.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using one or more of the general controller 205, the automation and calibration controller 280, the optical and trap controller 220, and the chamber 250.

Figure 3:
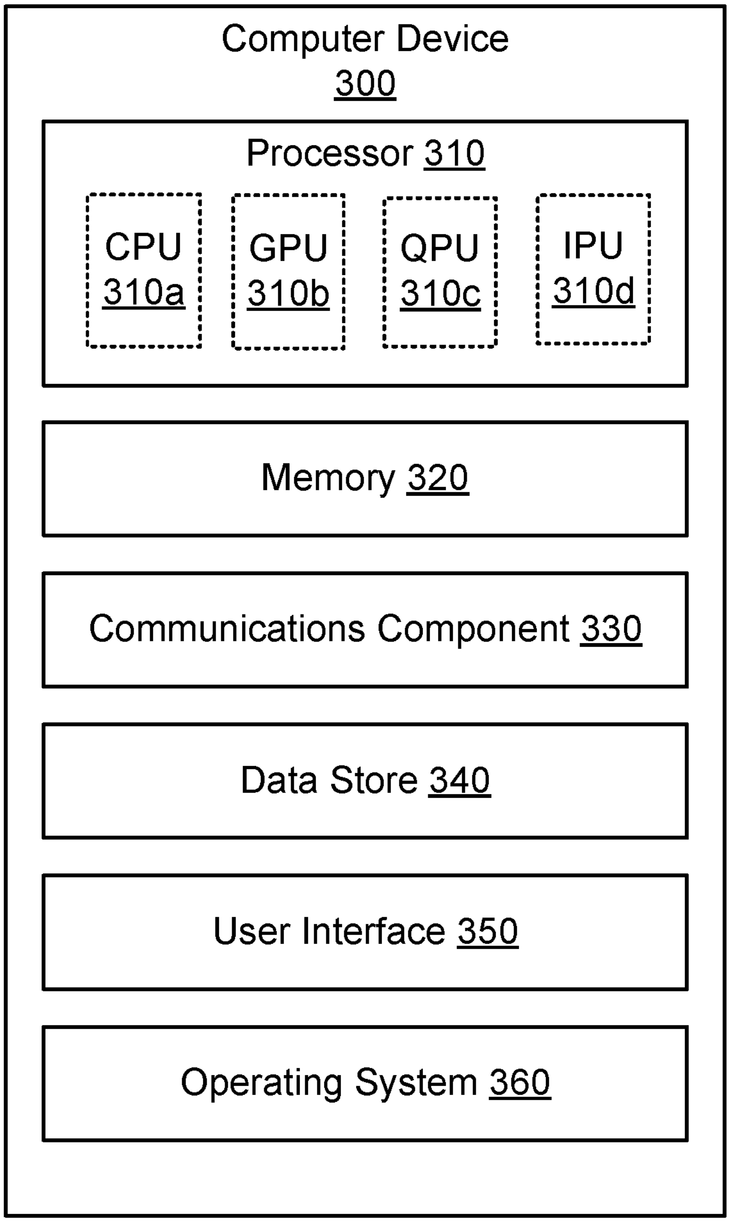
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310*a*, one or more graphics processing units (GPUs) 310*b*, one or more quantum processing units (QPUs) 310*c*, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310*c*. Some or all of the QPUs 310*c* may use atomic-based qubits, however, it is possible that different QPUs are based on different qubit technologies. One or more of the QPUs 310*c* may be fully connected QPUs in accordance with aspects of this disclosure.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices.

The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, a technique or method for calibration is described for a fully connected n-qubit QPU where quantum resources in the QPU are used more optimally to reduce the amount of classical computation time and the amount of quantum preparation time (i.e., to prepare the qubits for interrogation) and thus reduce the calibration overhead to support scaling to the larger QPU architectures. The technique reduces the number of calibrations from $n\cdot(n-1)/2$ to at most n calibrations. This is accomplished by preparing all qubits simultaneously and then running the given calibration routines in tandem on qubits that are non-overlapping. Running a calibration routine may also be referred to as calling or running a calibration script.

The problem described above and its solution can be treated like an edge coloring problem, where the objective is to minimize the number of colors required to color the complete graph. From graph theory for an odd number of vertices there are n required colors and for an even number of vertices there are $n-1$ required number of colors. When applying such a concept to the calibration optimization proposed in this disclosure, the number of colors that are needed correspond to number of independent calls to the needed calibration routine or script in a QPU, where each call incurs both classical computation overhead and quantum preparation overhead such that the fewer the number of colors that are needed the fewer the number of call and the more optimized the use of quantum resources for calibration.

Figure 4:
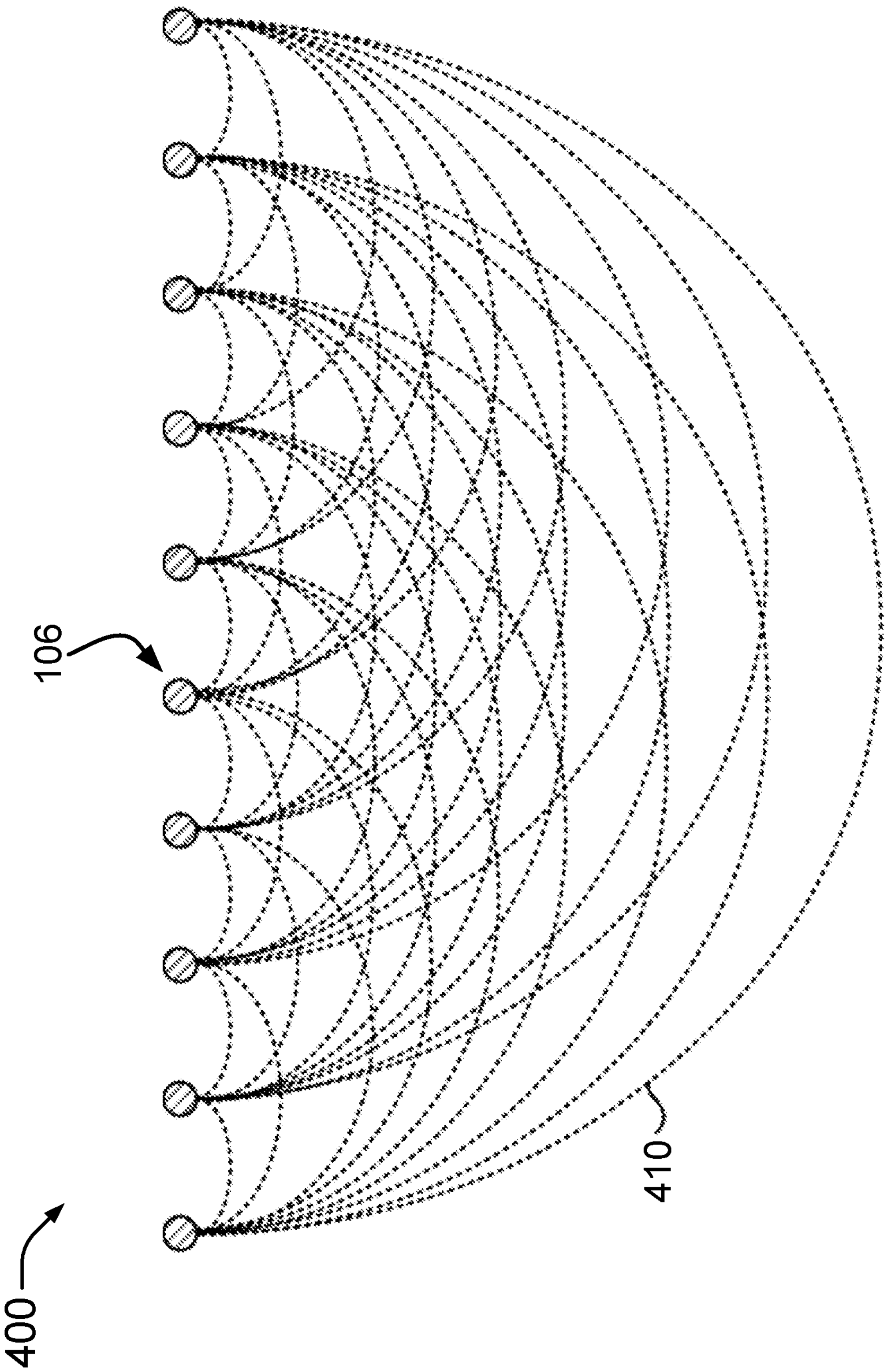
FIG. 4 illustrates an example of a fully connected quantum processing unit (QPU) in accordance with aspects of this disclosure.

FIG. 4 shows a diagram 400 that illustrates an example of having a fully connected QPU where the qubits in the QPU are implemented using ions 106 (see e.g., FIG. 1), although other types of qubit technologies may also lend themselves to a fully connected QPU. In this example, the qubits or ions 106 are aligned as in the chain 110 in the diagram 100 in FIG. 1 and connections 410 are shown between any two qubits to illustrate the capability for full connectivity. The number of qubits used in this example is provided only by way of illustration and more or fewer qubits may be used in a fully connected QPU.

Figure 5:
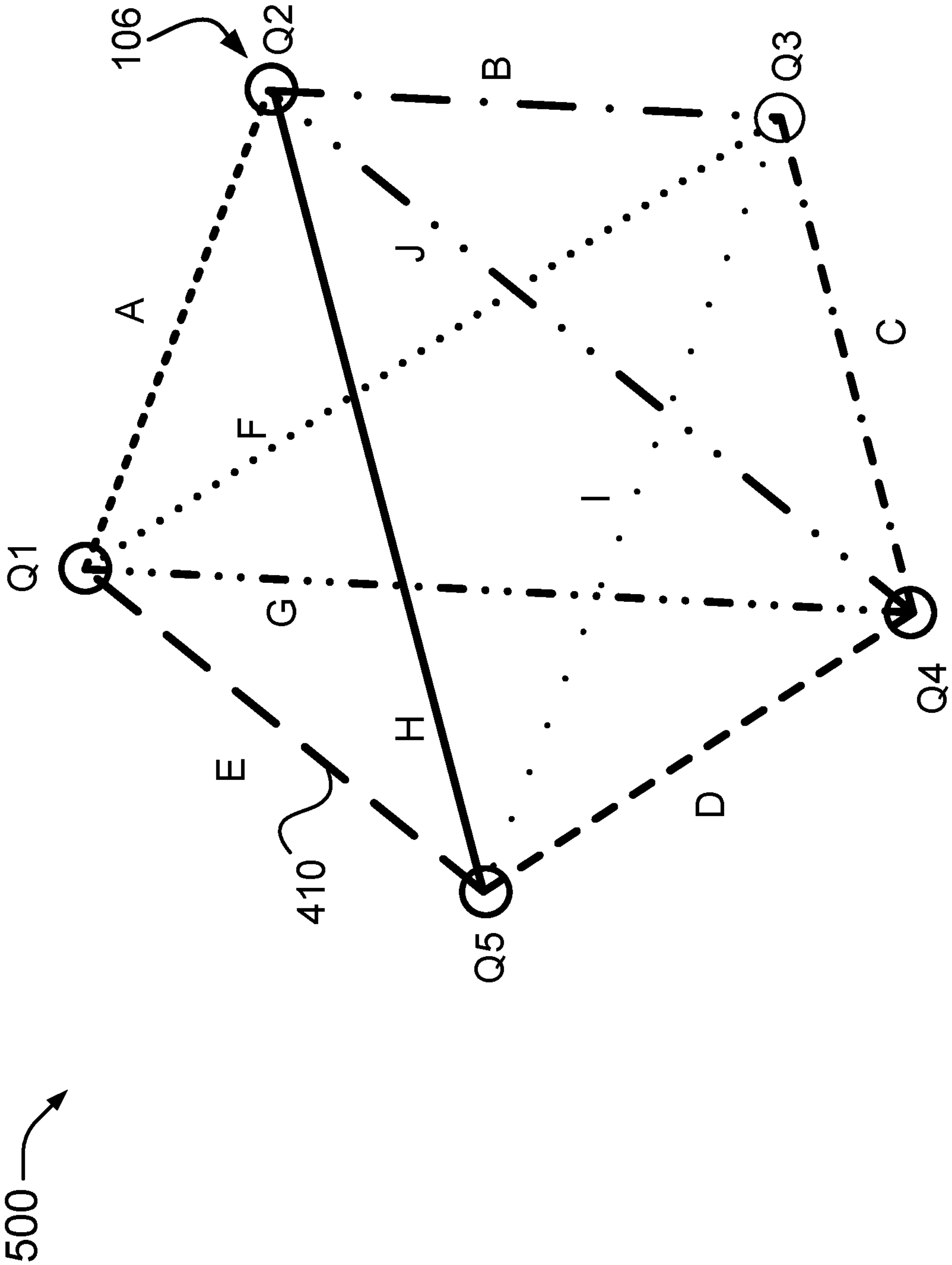
FIG. 5 illustrates an example of a non-optimized calibration approach for a fully connected QPU in accordance with aspects of this disclosure.

FIG. 5 shows a diagram 500 that illustrates an example of a non-optimized calibration approach for a fully connected 5-qubit QPU. The diagram 500 shows an edge-based representation, which is a different way to see the same type of full connectivity described above in connection with the diagram 400 in FIG. 4. In this representation, the qubits or ions 106 are not in a linear arrangement as in the diagram 400 and instead are arranged in a pentagonal scheme merely for illustration purposes. A connection 410 between any two qubits or ions 106 in the diagram 400 is represented in the diagram 500 by a straight line or edge as opposed to a curved line, again for illustration purposes.

When calibration of pairs of qubits is not optimized, the calibration of each pair of qubits is going to require a separate call to a calibration routine or script, and each of those calls comes with a substantial amount of computational, preparation, and measurement overhead. For the non-optimized fully connected 5-qubit QPU in the diagram 500, the total number of separate routine or script calls is 10. For example, a separate or independent call is needed for calibrating the pair of qubits Q1-Q2, which is shown by the connection between the two qubits being indicated by an edge color labeled as A. Separate or independent calls are also needed for pairs Q2-Q3 (color B), Q3-Q4 (color C), Q4-Q5 (color D), Q5-Q1 (color E), Q1-Q3 (color F), Q1-Q4 (color G), Q2-Q4 (color J), Q2-Q5 (color H), and Q3-Q5 (color I). To illustrate the different colors, each edge between two qubits representing a connection with a different color (i.e., a separate call) is shown with a different line pattern (e.g., dashes, dots, dash length, number of dots, arrangement of dashes and dots). Therefore, to calibrate each possible qubit pair in the fully connected 5-qubit QPU in the diagram 500 without any optimization, a total of 10 different colors are needed according to the edge coloring approach, and as a result, a total of 10 separate or independent calls to a calibration routine or script need to be made to complete the calibration of the QPU.

Figure 6:
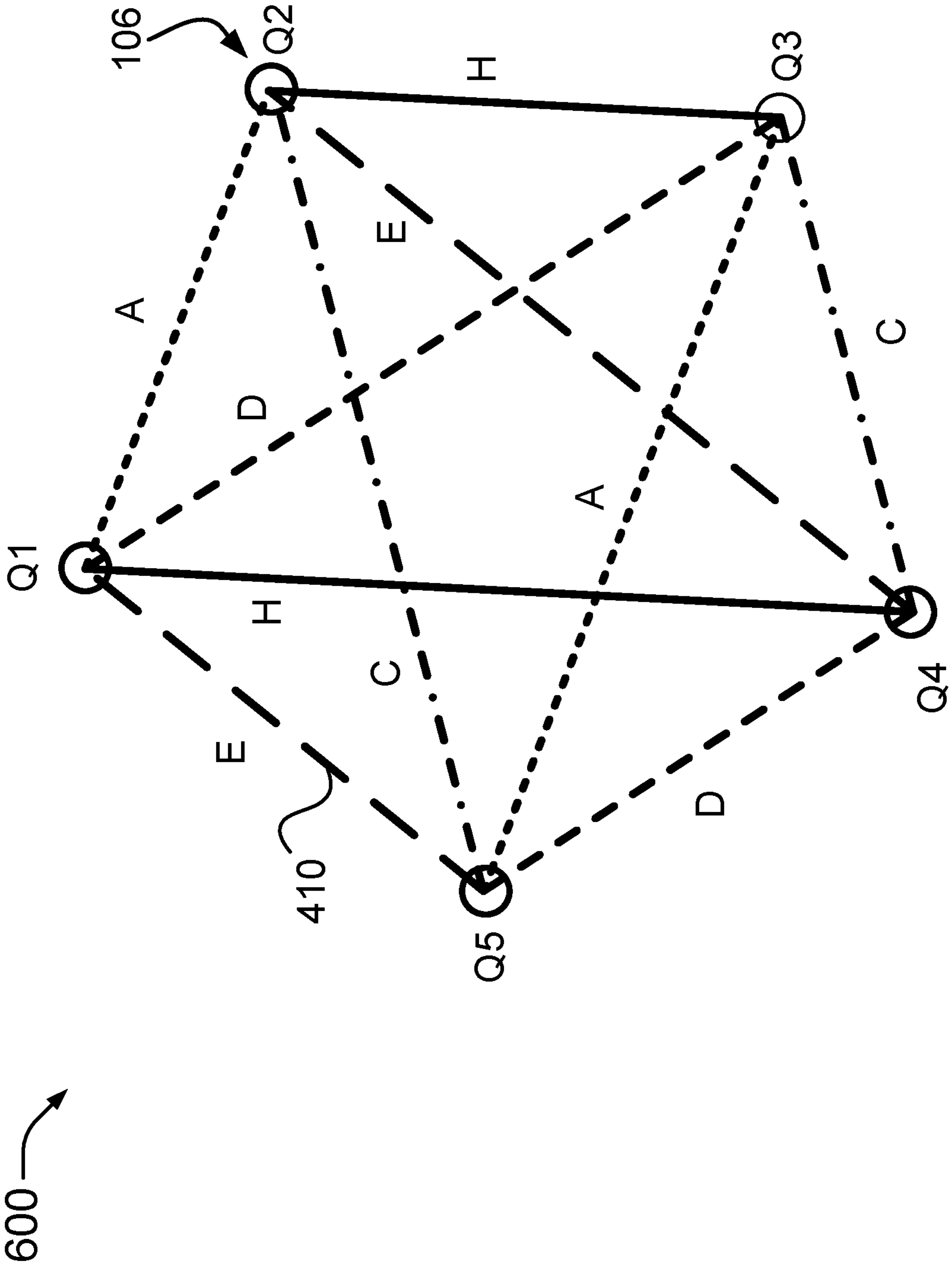
FIG. 6 illustrates an example of an optimized calibration approach for a fully connected QPU in accordance with aspects of this disclosure.

FIG. 6 shows a diagram 600 that illustrates an example of an optimized calibration approach for the fully connected 5-qubit QPU represented by the diagram 500 in FIG. 5.

When calibration of pairs of qubits is optimized, the calibration of two or more pairs of qubits can be made with a single, separate call to a calibration routine or script. For the optimized fully connected 5-qubit QPU in the diagram 600, the total number of separate routine or script calls is now 5 because each call can be used to calibrate 2 pairs of qubits instead of a single pair of qubits as in the non-optimized case. For example, a separate or independent call may be used for calibrating the pair of qubits Q1-Q2 and the pair of qubits Q3-Q5 together, which is shown by the connection between both pairs of qubits being indicated by the color labeled as A. Qubit pairs Q2-Q3 and Q1-Q4 (color H) require a single, separate, or independent call, as do qubit pairs Q3-Q4 and Q2-Q5 (color C), Q4-Q5 and Q1-Q3 (color D), and Q2-Q4 and Q1-Q5 (color E). Therefore, to optimally calibrate all qubit pairs in the fully connected 5-qubit QPU in the diagram 600, a total of 5 different colors are needed according to the edge coloring approach, and as a result, a total of 5 separate or independent calls to a calibration routine or script need to be made to complete the calibration of the QPU.

As mentioned above, the 2 pairs of qubits for which a single calibration routine can be used are those 2 pairs for which the qubits are non-overlapping. For example, the qubits in Q1-Q2 and Q3-Q5 do not overlap. That is, the two qubits in the first pair, Q1 and Q2, are different from the two qubits in the second pair, Q3 and Q5. The same goes for Q2-Q3 and Q1-Q4, Q3-Q4 and Q2-Q5, Q4-Q5 and Q1-Q3, and Q2-Q4 and Q1-Q5.

The optimized case described above clearly reduces the number of calibration routine or script calls and the total amount of calibration overhead by being able to reuse colors (i.e., reuse calibration calls), where in the non-optimized case many more colors are needed and each new color represents an independent call to the QPU for calibration of a given gate pair set. The optimized case allows for several calibration experiments to run using the same preparation step thereby reducing the overhead in calibrations from $n \cdot (n-1)/2$ to at most n for any given parameter. Additionally, because there are known algorithms to perform this edge coloring procedure this is extensible to any n.

Figure 7A:
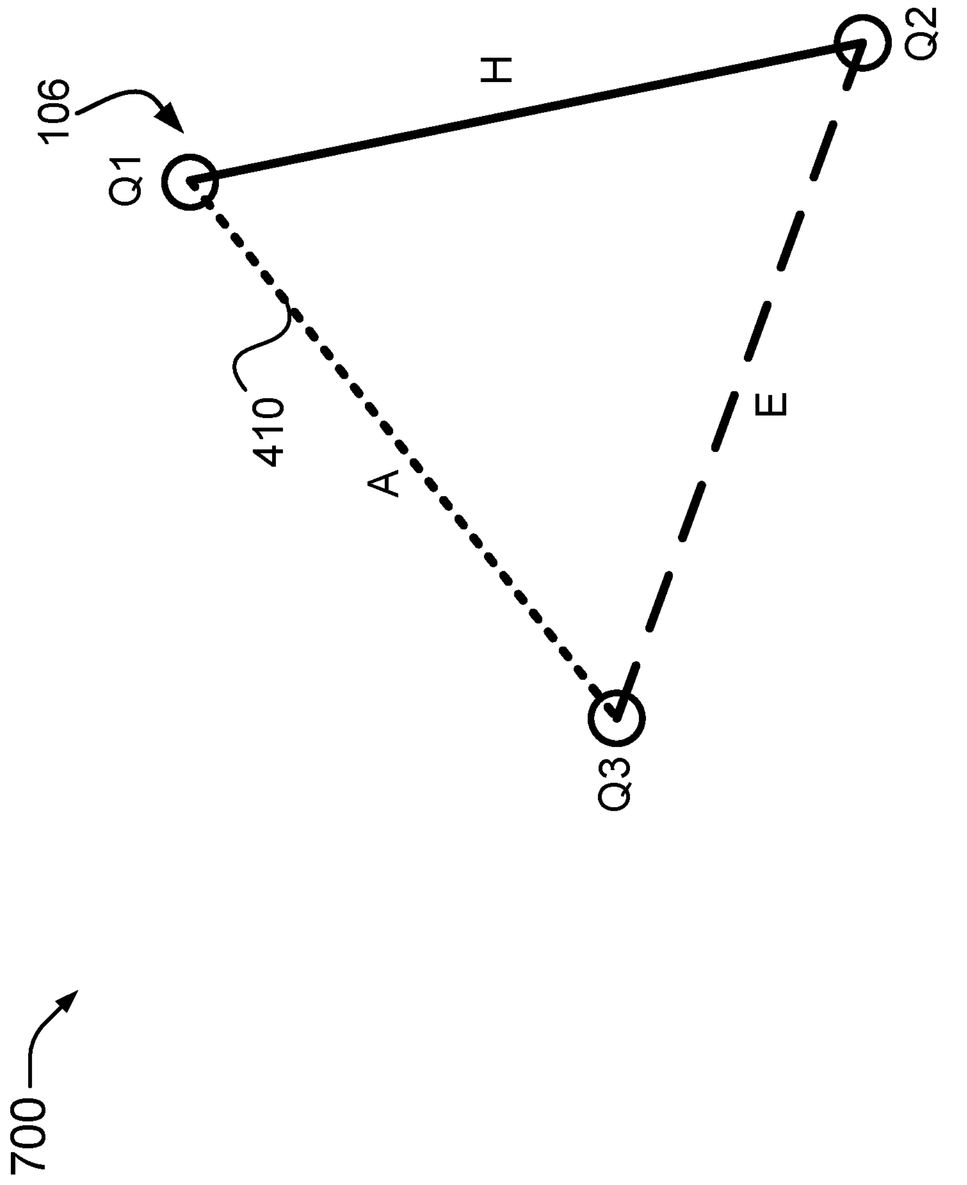
FIGS. 7A and 7B illustrate examples of optimized calibration for fully connected QPUs with different numbers of qubits in accordance with aspects of this disclosure.
Figure 7B:
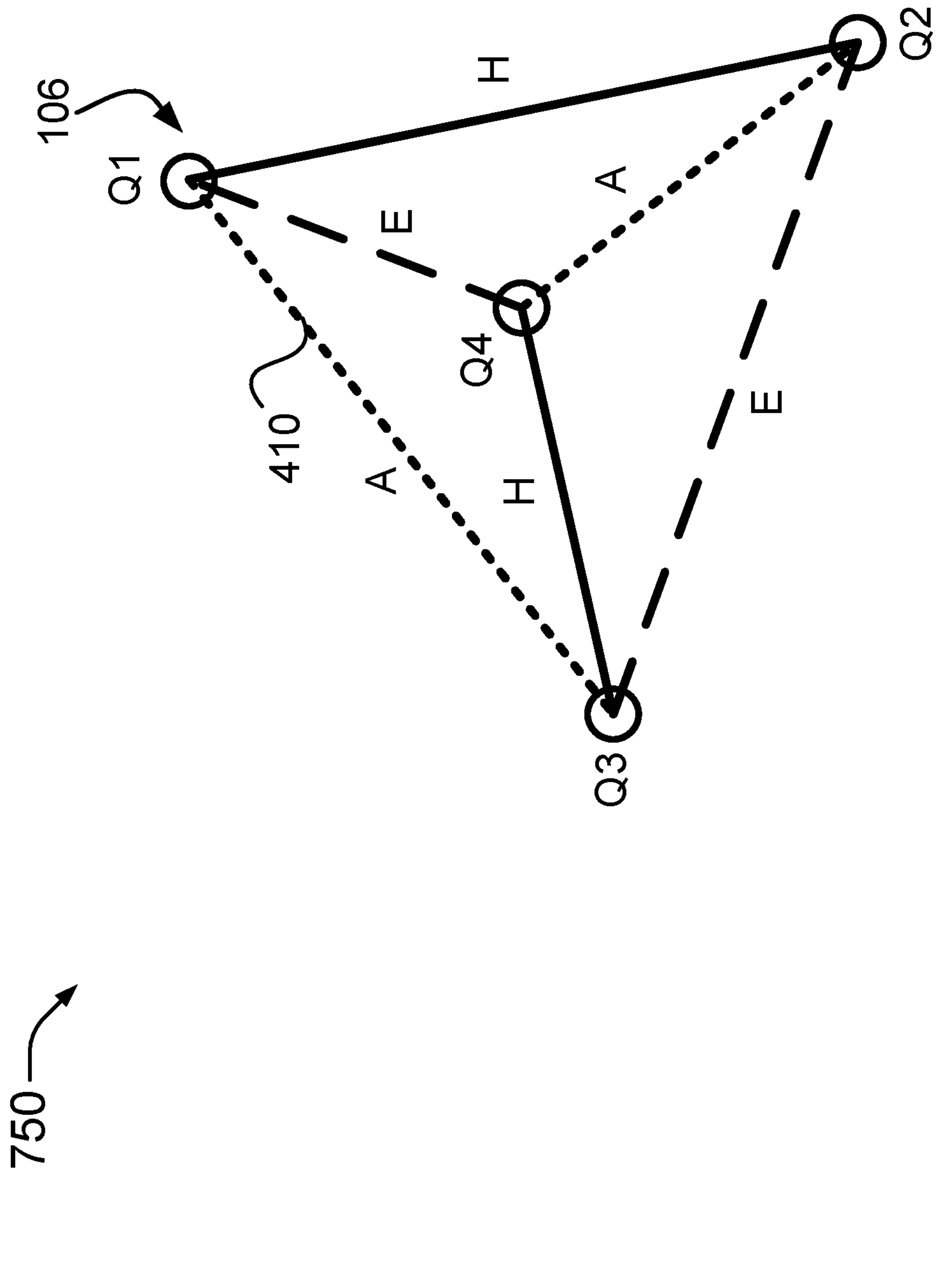

FIGS. 7A and 7B illustrate examples of optimized calibration for fully connected QPUs with different numbers of qubits. These figures are merely intended to show that the calibration approach described herein applies to a QPU having any number of qubits and that the total number of calibration routine or script calls for an optimized case can vary depending on whether the number of qubits is even or odd. As mentioned above, from graph theory, for an odd number of vertices or qubits there are n required colors or calibration calls, and for an even number of vertices or qubits there are $n-1$ required number of colors or calibration calls.

A fully connected 3-qubit QPU is represented in a diagram 700 in FIG. 7A. The total number of separate routine or script calls (colors) needed to calibrate the QPU is 3 since there are an odd number of qubits and $n=3$. A separate or independent call may be used for calibrating the pair of qubits Q1-Q2 (color H), the pair of qubits Q2-Q3 (color E), and the pair of qubits Q1-Q3 (color A).

A fully connected 4-qubit QPU is represented in a diagram 750 in FIG. 7B. The total number of separate routine or script calls (colors) needed to calibrate the QPU is 3 since there are an even number of qubits and $n-1=3$. A separate or independent call may be used for calibrating the pairs of qubits Q1-Q2 and Q3-Q4 (color H), the pairs of qubits Q2-Q3 and Q1-Q4 (color E), and the pairs of qubits Q1-Q3 and Q2-Q4 (color A).

Figure 8:
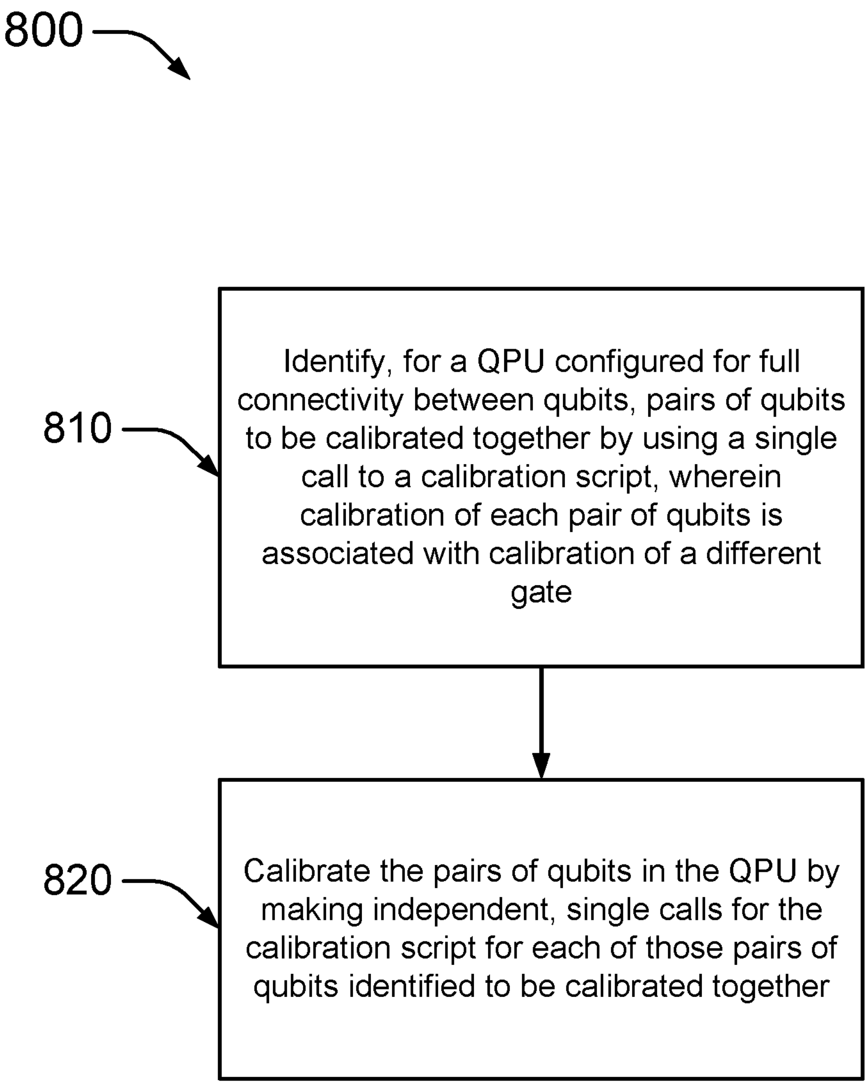
FIG. 8 illustrates a flow chart describing a method for optimized calibration for fully connected QPUs in accordance with aspects of this disclosure.

FIG. 8 illustrates a flow chart describing a method 800 for optimizing calibration of a quantum processing unit (QPU) for gate-based operations.

At 810, the method 800 includes identifying, for a QPU configured for full connectivity between qubits, pairs of qubits to be calibrated together by using a single call to a calibration script, wherein calibration of each pair of qubits is associated with calibration of a different gate.

At 820, the method 800 includes calibrating the pairs of qubits in the QPU by making independent, single calls for the calibration script for each of those pairs of qubits identified to be calibrated together.

In an aspect of the method 800, the pairs of qubits identified to be calibrated together are those pairs of qubits with non-overlapping qubits.

In an aspect of the method 800, the identification of the pairs of qubits to be calibrated together by using the single call to the calibration script is based on an edge coloring problem solution corresponding to a number of qubits in the QPU.

In an aspect of the method 800, the calibration script includes classical computations and state preparation operations.

In an aspect of the method 800, the calibration of the pairs of qubits in the QPU includes the calibration of the different gates associated with the QPU.

In an aspect of the method 800, wherein the QPU includes an ion trap configured to hold ions for use as the qubits of the QPU.

In an aspect of the method 800, the pairs of qubits to be calibrated together by the single call include two or more pairs of qubits to be calibrated together.

In an aspect of the method 800, making independent, single calls for the calibration script for each of those pairs of qubits identified to be calibrated together includes at least making an independent, single call to calibrate a first group of pairs of qubits and making an independent, single call to calibrate a second group of pairs of qubits.

Aspects of this disclosure describe a QIP system having a QPU (e.g., the QPU 310*c*) configured for full connectivity between qubits, a general controller (e.g., the general controller 205), and an optical and trap controller (e.g., the optical and trap controller 220). The general controller is configured to identify, for the QPU, pairs of qubits to be calibrated together by using a single call to a calibration script, wherein calibration of each pair of qubits is associated with calibration of a different gate. The general controller and the optical and trap controller are configured to calibrate the pairs of qubits in the QPU by making independent, single calls for the calibration script for each of those pairs of qubits identified to be calibrated together.

In an aspect of the QIP system, the QIP system is configured to perform and/or implement the features described in connection with the method 800.

This disclosure provides with a technique to minimize the overhead in classical computation time and state preparation time (which is a significant portion of every shot/scan point) used in the calibration of gates or pairs of qubits used for the gates in a QPU. The goal is to use calibration time more optimally by doing multiple gates in a single shot. In a single shot (e.g., a single call to a calibration routine or script) multiple gates are run sequentially where the pair of ions in a given gate are picked so that the fully span of connections (edges in the graph) is covered optimally (this works for a fully connected, complete graph) and in that way reduce the number of scans needed from $n \cdot (n-1)/2$ to either $(n-1)$ or n depending on the number of ions/qubits in the QPU. With this approach all gates still end up being calibrated but the time where qubits have been prepared and cooled is more efficiently used.

Is it to be understood that while this disclosure describes a technique to minimize the overhead in classical computation time and state preparation used in the calibration of gates or pairs of qubits used for the gates in a fully connected QPU architecture, the disclosure need not be so limited. The techniques or approach described herein is also applicable to QPUs or qubit registers that are not fully connected by allowing the application of pairwise calibrations in tandem in such systems. In other words, the technique may apply to methods in which for a QPU that is not configured for full connectivity between qubits, one or more pairs of qubits to be calibrated together by using a single call to a calibration script are identified, wherein calibration of each pair of qubits is associated with calibration of a different gate. In these methods, those pairs of qubits identified in the QPU are calibrated by making independent, single calls for the calibration script for each of those pairs of qubits identified to be calibrated together.

Moreover, the technique described herein to minimize the overhead in classical computation time and state preparation used in the calibration of gates or pairs of qubits used for the gates in a QPU architecture may be used to calibrate m pairs in a single call to a calibration script, where m is less than n/2.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed:

1. A method for calibrating a quantum processing unit (QPU) for gate-based operations, comprising:

identifying, for a QPU configured for full connectivity between qubits, pairs of qubits to be calibrated together by using a single call to a calibration script based on an edge coloring problem solution corresponding to a number of qubits in the QPU, wherein a calibration of each pair of qubits is associated with calibration of a different gate; and calibrating the identified pairs of qubits in the QPU by making independent, single calls for the calibration script for each of those pairs of qubits identified to be calibrated together.

2. The method of claim 1, wherein the pairs of qubits identified to be calibrated together are those pairs of qubits with non-overlapping qubits.

3. The method of claim 1, wherein the identified pairs of qubits in the QPU are calibrated to reduce overhead from n (n−1)/2 independent calls to at most n independent calls, wherein n corresponds to a number of qubits in the QPU.

4. The method of claim 1, wherein the calibration script comprises classical computations and state preparation operations.

5. The method of claim 1, wherein calibrating the identified pairs of qubits in the QPU includes calibrating the different gates associated with the QPU.

6. The method of claim 1, wherein the QPU comprises an ion trap configured to hold ions for use as the qubits of the QPU.

7. The method of claim 1, wherein the pairs of qubits to be calibrated together include two or more pairs of qubits to be calibrated together.

8. A quantum information processing (QIP) system, comprising:

a quantum processing unit (QPU) configured for full connectivity between qubits;

a general controller configured to identify, for the QPU, pairs of qubits to be calibrated together by using a single call to a calibration script based on an edge coloring problem solution corresponding to a number of qubits in the QPU, wherein a calibration of each pair of qubits is associated with calibration of a different gate; and an optical and trap controller configured to calibrate, with the general controller, the identified pairs of qubits in the QPU by making independent, single calls for the calibration script for each of those pairs of qubits identified to be calibrated together.

9. The QIP system of claim 8, wherein the pairs of qubits identified to be calibrated together are those pairs of qubits with non-overlapping qubits.

10. The QIP system of claim 8, wherein the identified pairs of qubits in the QPU are calibrated to reduce overhead from n (n−1)/2 independent calls to at most n independent calls, wherein n corresponds to a number of qubits in the QPU.

11. The QIP system of claim 8, wherein the calibration script comprises classical computations and state preparation operations.

12. The QIP system of claim 8, wherein the optical and trap controller is further configured to calibrate, with the general controller, the identified pairs of qubits in the QPU by calibrating the different gates associated with the QPU.

13. The QIP system of claim 8, wherein the QPU comprises an ion trap configured to hold ions for use as the qubits of the QPU.

14. The QIP system of claim 8, wherein the pairs of qubits to be calibrated together include two or more pairs of qubits to be calibrated together.

15. The QIP system of claim 8, wherein the independent, single calls for the calibration script for each of those pairs of qubits identified to be calibrated together include at least an independent, single call to calibrate a first group of pairs of qubits and an independent, single call to calibrate a second group of pairs of qubits.

16. A non-transitory computer readable medium containing program instructions for causing a computer to calibrate a quantum processing unit (QPU) for gate-based operations, comprising:

code for identifying, for a QPU configured for full connectivity between qubits, pairs of qubits to be calibrated together by using a single call to a calibration script based on an edge coloring problem solution corresponding to a number of qubits in the QPU, wherein a calibration of each pair of qubits is associated with calibration of a different gate; and code for calibrating the identified pairs of qubits in the QPU by making independent, single calls for the calibration script for each of those pairs of qubits identified to be calibrated together.

17. The non-transitory computer readable medium of claim 16, wherein the pairs of qubits identified to be calibrated together are those pairs of qubits with non-overlapping qubits.

18. The non-transitory computer readable medium of claim 16, wherein the identified pairs of qubits in the QPU are calibrated to reduce overhead from n (n−1)/2 independent calls to at most n independent calls, wherein n corresponds to a number of qubits in the QPU.

19. The non-transitory computer readable medium of claim 16, wherein the calibration script comprises classical computations and state preparation operations.

20. The non-transitory computer readable medium of claim 16, wherein the pairs of qubits to be calibrated together include two or more pairs of qubits to be calibrated together.

* * * * *